(12) United States Patent
Taherkhani et al.

(10) Patent No.: US 12,719,122 B2
(45) Date of Patent: Aug. 25, 2026

(54) BATTERY PACK SYSTEM

(71) Applicant: Solid Power Operating, Inc., Louisville, CO (US)

(72) Inventors: Khay Taherkhani, Longmont, CO (US); Joshua Buettner-Garrett, Arvada, CO (US); Brandon Kelly, Longmont, CO (US)

(73) Assignee: Solid Power Operating, Inc., Louisville, CO (US)

( * ) Notice: Subject to any disclaimer, the term of this patent is extended or adjusted under 35 U.S.C. 154(b) by 623 days.

(21) Appl. No.: 18/199,038

(22) Filed: May 18, 2023

(65) Prior Publication Data

US 2023/0378580 A1 Nov. 23, 2023

Related U.S. Application Data

(60) Provisional application No. 63/343,433, filed on May 18, 2022.

(51) Int. Cl.
*H01M 50/209* (2021.01)
*H01M 10/42* (2006.01)

(52) U.S. Cl.
CPC ..... *H01M 50/209* (2021.01); *H01M 10/4214* (2013.01); *H01M 10/4257* (2013.01); *H01M 2220/20* (2013.01)

(58) Field of Classification Search
CPC ........... H01M 50/209; H01M 10/4214; H01M 10/4257; H01M 2220/20
See application file for complete search history.

(56) References Cited

U.S. PATENT DOCUMENTS

| | | | | |
|---|---|---|---|---|
| 10,950,832 | B2 | 3/2021 | Kawakami et al. | |
| 2010/0130322 | A1* | 5/2010 | Harif | F16H 61/64 475/59 |
| 2011/0177377 | A1 | 7/2011 | Dube | |
| 2012/0208054 | A1* | 8/2012 | Shirasawa | H01M 10/0468 429/90 |
| 2014/0315682 | A1* | 10/2014 | Helmer | B60W 20/40 903/902 |
| 2020/0280109 | A1 | 9/2020 | Nam et al. | |
| 2021/0273289 | A1* | 9/2021 | Torres | H01M 50/367 |

(Continued)

FOREIGN PATENT DOCUMENTS

| | | | |
|---|---|---|---|
| CN | 103794741 | A | 5/2014 |
| CN | 205139249 | U * | 4/2016 |

(Continued)

OTHER PUBLICATIONS

CN-205139249 MT (Year: 2016).*

(Continued)

*Primary Examiner* — Alexander Usyatinsky
(74) *Attorney, Agent, or Firm* — Polsinelli PC; Derek Donahoe

(57) ABSTRACT

Aspects of the disclosure involve a battery pack involving one or more stacks of battery cells, where the stacks of battery of cells are captured between plates or other members that are controlled to maintain force on the cells to manage the pressure on the cells in the stack. Some battery cells technologies, such as some forms of solid-state cells, optimally operate under a controlled stack pressure provided by the systems described herein.

25 Claims, 14 Drawing Sheets

(56) References Cited

U.S. PATENT DOCUMENTS

| | | | |
|---|---|---|---|
| 2021/0384527 | A1 | 12/2021 | Greszler et al. |
| 2022/0158295 | A1 | 5/2022 | Kotik et al. |
| 2022/0255170 | A1 | 8/2022 | Kotik et al. |
| 2022/0271326 | A1 | 8/2022 | Kaufmann et al. |
| 2023/0115565 | A1 | 4/2023 | Muelberger |
| 2023/0238672 | A1 | 7/2023 | Bai et al. |

FOREIGN PATENT DOCUMENTS

| | | | | |
|---|---|---|---|---|
| CN | 211897585 | U | * | 11/2020 |
| CN | 109742270 | A | | 8/2022 |
| DE | 102016009394 | A1 | | 2/2017 |
| DE | 102017212449 | A1 | | 1/2019 |
| DE | 102019004928 | A1 | | 1/2021 |
| DE | 102020108136 | B3 | | 6/2021 |
| EP | 3886202 | A1 | | 9/2021 |
| JP | 4892897 | B2 | | 3/2012 |
| JP | 5594264 | B2 | | 9/2014 |
| JP | 2015022817 | A | | 2/2015 |
| JP | 2018063865 | A | | 4/2018 |
| JP | 7272788 | B2 | | 5/2023 |
| WO | WO 2016-045855 | A1 | | 3/2016 |
| WO | 2019/017994 | A1 | | 1/2019 |

OTHER PUBLICATIONS

CN-211897585 MT (Year: 2020).*

International Searching Authority, International Search Report and Written Opinion, issued for International Application No. PCT/US2023/022691, mailed Mar. 25, 2024.

* cited by examiner

BATTERY PACK SYSTEM

CROSS-REFERENCE TO RELATED APPLICATION

This application is related to and claims priority under 35 U.S.C. § 119(e) from U.S. Patent Application No. 63/343,433 filed May 18, 2022, titled "Battery Pack System", the entire contents of which is incorporated herein by reference for all purposes.

TECHNICAL FIELD

Embodiments of the present invention generally relate to systems and methods for controlling force on battery cells to maintain proper operation of the same through charge and discharge cycles of the same.

BACKGROUND AND INTRODUCTION

Solid-state battery cells are often deployed in a pouch configuration. The battery cell often comprises a layered structure that includes an anode and a cathode separated by a solid electrolyte. The layered structure, which may include multiple units of anode, electrolyte, cathode layers, is encased in a flexible laminate structure, which in some cases is referred to as a pouch. A flexible pouch is used in some solid-state batteries because the discrete cells expand and contract during charge and discharge.

More particularly, referring to an example of a cathode material that is a lithium-containing compound, during charging, Li+ ions are extracted from the cathode and migrate to the anode by way of the solid electrolyte, and electrons transfer from the cathode to anode through whatever device is charging the battery. In contrast, during discharging, Li+ ions and electrons migrate and flow in the reverse direction, accompanied with cathode reduction, and anode oxidation. Electrons here flow through whatever device is being powered by the battery. A pouch casing is advantageous because the anode and cathodes expand and contract during charge and discharge albeit unequally. Namely, the anode expands disproportionally more than the cathode shrinks, resulting in a net positive expansion of a cell as the ions move from the cathode to the anode when charging. Conversely, the anode then shrinks disproportionally more than the cathode expands, resulting in a net negative shrinking of the cell when discharging.

Complicating the situation of cells differentially contracting and expanding, it is advantageous to maintain contact and pressure between the particles that make up various layers, as well as between the layers. Moreover, it may be important to manage the pressure so that it is evenly distributed as well as maintain the pressure at whatever the specified value for any particle cell type. Improper pressure management can lead to various problems including increased resistance, non-uniformities within the cell, capacity fade, decreased cycle life, dendrite growth and others.

It is with these observations in mind, among others, that various aspects of the present disclosure were conceived.

SUMMARY

Aspects of the present disclosure involve a battery force management system comprising a first cell stack, which cells may be solid-state cells and more particularly solid-state pouch cells, positioned between a first member and a second member, the first member movably mounted and arranged to apply a force on the first cell stack. The system includes a drive unit operably coupled with the first member to move the first member to controllably apply the force. The drive unit may be operably coupled with the first member to move the first member to controllably apply the force responsive to a determination of the force on the first cell stack. The determination of the force on the first cell stack may be based on a change in the first cell stack during a charge or discharge of the cell stack.

In a particular aspect, the system may further comprise a first threaded drive rod operably coupled with the drive unit to rotate the first threaded drive rod with the first threaded drive rod operably coupled with a threaded portion of the first member, and the operable coupling of the threaded drive rod with the threaded portion of the first member to move the first member to controllably apply the force responsive to the determination of the force during the change in the cell stack. In another aspect, the system may further comprise a second threaded drive rod operably coupled with the drive unit to rotate the second threaded drive rod where the second member is movably mounted and arranged to cooperate with the first member to apply the force on the cell stack, and the first threaded drive rod and the second threaded drive rod each including a first threaded portion and a second threaded portion, and where the first threaded portions are coupled with respective first threaded portions of the first member and the second threaded portions coupled with respective second threaded portions of the second member to move the first member and the second member inwardly toward each other or outwardly away from each other to controllably apply the force responsive to the determination of the force during the change in the cell stack.

In various possible examples, the drive unit comprises a planetary gear assembly with a planet gear operably coupled with the drive rod and a sun gear to drive the planet gear. The drive unit may further comprise a motor supporting a worm gear to drive the sun gear. In another example, the drive unit comprises a belt and pulley system with a pulley coupled with the drive rod and a motor coupled with the pulley by way of a belt. In this example, the motor is coupled with the movable member.

In another example, the system may comprise a second cell stack, which may also be solid-state cells, positioned between a third member and a fourth member, the third member movably mounted and arranged to apply a force on the second cell stack. In this example, the drive unit is positioned between the first cell stack and the second cell stack, and the drive unit is further operably coupled with the third member to move the third member to controllably apply the force responsive to a determination of the force during a change in the cell stacks. The drive unit may be a motor configured to turn a threaded axle that cooperates with a first threaded portion of the first member and a third threaded portion of the third member to move the first member toward the second member or away from the second member and move the third member toward the fourth member or away from the fourth member to controllably apply the force responsive to a determination of the force during a change in the cell stacks.

In the various possible examples and arrangements, the system may comprise a load unit positioned to determine the force on the first cell stack and/or other cell stacks.

In various possible examples, the first, second, third and/or fourth members may be a plate and specifically may be a box end plate.

Another aspect of the present disclosure involves a method of controlling battery cell stack pressure comprising or accessing a value indicative of cell stack pressure, and, responsive to the value indicative of cell stack pressure, controllably altering a position of at least one member operably engaging a stack of cells where the altering of the position of the at least one member changes the cell stack pressure. The stack of cells may comprise a plurality of solid-state pouch cells where each of the plurality of solid-state pouch cells changes volume in response to charge or discharge. In one arrangement, the at least one member is a plate in operably contact with at least one cell of the stack of cells, and the altering of the position of the plate adjusts a force on the stack of cells. The value may be indicative of cell stack pressure and be a force measurement. The value may be indicative of cell stack pressure changes during charge and discharge of the solid-state pouch cells. Further, the value may be indicative of cell stack pressure and is a sensor measurement indicative of force on the at least one member. Further, the at least one member may comprise a first plate and a second plate, where the first plate and the second plate are controllably movable relative to the stack of cells, the stack of cells positioned between the first plate and the second plate such as a relative movement of at least one of the first plate or the second plate adjusts force on the stack of cells.

These and other aspects of the present disclosure are described in further detail below.

BRIEF DESCRIPTION OF THE DRAWINGS

The various objects, features, and advantages of the present disclosure set forth herein will be apparent from the following description of embodiments of those inventive concepts, as illustrated in the accompanying drawings. It should be noted that the drawings are not necessarily to scale, may only include certain features representative of various features of an embodiment, the emphasis being placed on illustrating the principles and other aspects of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1A:
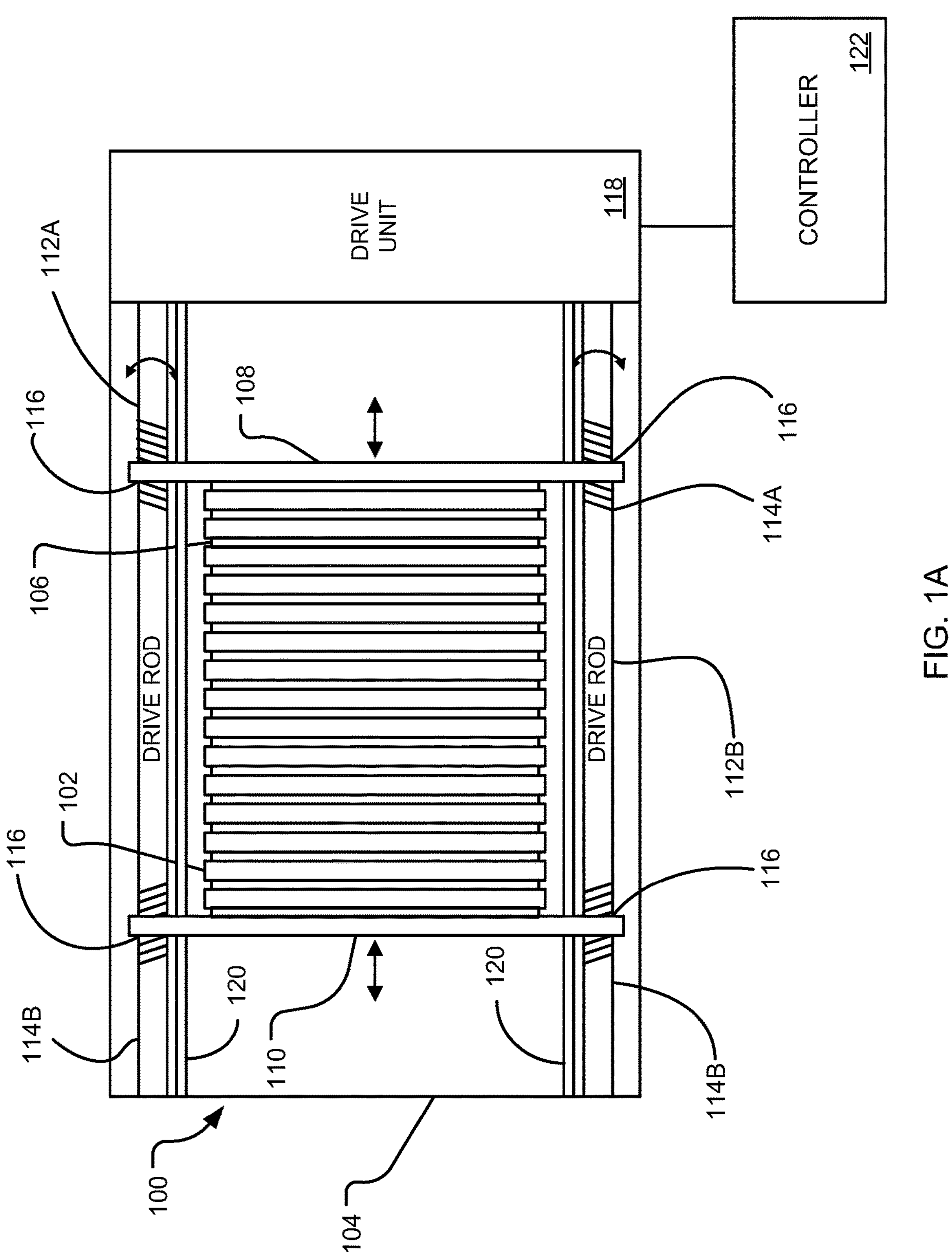
FIG. 1A is a representative top view of a battery pack including translationally supported end plates that are movably controlled to provide force on battery cells, with the cells in a relatively discharged state such that cells are of lesser width than a more fully charged state.

Aspects of the present disclosure involve various systems and methods that monitor a battery pack of cells, which may be pouch type cells, and adjust the external force on the cells to maintain optimal pressure on and within the cells for optimal operation as a pack of such cells cycles between charged and discharged states, as well as maintaining proper pressure when the pack of cells is sitting in a state of equilibrium and not charging or discharging. At a high level, to function properly, it is advantageous to maintain even and proper pressure on each battery cell for optimal operation. Providing proper pressure is advantageous for a variety of cell types including hybrid solid/liquid cells, some liquid cells including those using Lithium metal and Silicon anodes, and solid-state battery cells. In various examples set out herein, solid-state battery cells may be referenced but it should be appreciated that aspects of the present disclosure are useful for various forms of rechargeable battery cells where proper pressure application is advantageous to the operation of a cell as well as any battery pack incorporating multiple batteries.

In general, for a variety of cell types it is advantageous to maintain proper and relatively uniformly distributed contact of particles within the cell and between the various layers of any particular cell configuration. When appropriate contact and/or pressure is not maintained, there may be various possible problems including non-uniformities and increased resistance, which can lead to various possible deleterious effects on the cell or the operation of the cell or pack of cells. As such, the various embodiments discussed herein monitor the external force on the cells and control the external force on the cells to provide optimal force on the same and pressure within the cells while accommodating the expansion of the cells during charge and the shrinking of the cells during discharge. Besides expansion and contraction from charge and discharge, other factors may, alone or in combination, may be a factor in altering force on a cell stack such as temperature, charge state, atmospheric pressure, and other factors. Various aspects of the present disclosure also may enhance the even distribution of force on the cells so that pressure and attendant particle contact within the cells, is relatively evenly distributed, which may help avoid discontinuities with any given layer or between layers among other advantages.

The term "battery" in the art and herein can be used in various ways and may refer to an individual cell having an anode and cathode separated by an electrolyte, which may be a solid electrolyte, as well as a collection of such cells connected in various arrangements. A solid-state electrolyte battery cell may include more than one anode and cathode, separated by solid electrolyte, layers, and may be encased within a flexible "pouch" that accommodates the expansion and contraction of the anodes and cathodes as the battery cell charges and discharges. Although many examples are discussed herein as, it should be appreciated that the systems and methods described may apply to many different types of batteries, battery chemistries, and may range from an individual cell to batteries involving different possible interconnections of cells such as cells coupled in parallel, series, and parallel and series. The various implementations discussed herein may also apply to different structural battery arrangements including pouch battery cells and other battery structures that may accommodate size changes in the electrodes.

Figure 1B:
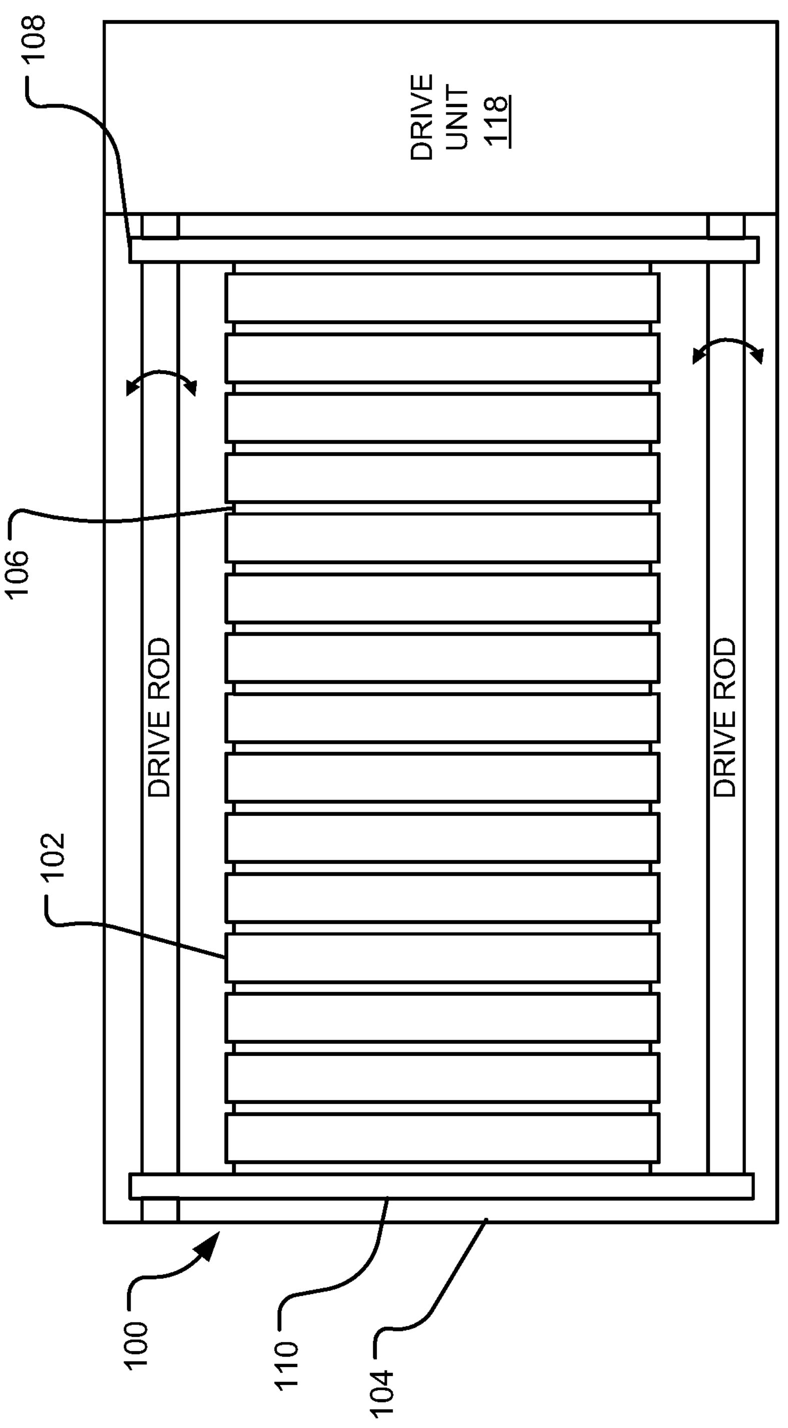
FIG. 1B is a representative top view of the battery pack of FIG. 1A with the cells in a relatively more charged state and with the end plates relatively further apart to accommodate the relatively higher relative width than the more discharged state of FIG. 1A while maintaining the proper force on the cells.

FIGS. 1A and 1B show a representative system diagram of a battery pack 100 comprising a collection of solid-state pouch cells 102 in a discharged state (FIG. 1A) and a charged state (FIG. 1B). Note, some details shown in FIG. 1A are not present in FIG. 1B. As can be seen, the individual cells are expanded in the charged state relative to the discharged state. The battery pack may comprise some form of encasement or housing 104 that houses the cells. Any number of possible housing configurations and arrangements are contemplated. As noted above, the example cells referenced in FIGS. 1A and 1B are solid-state battery cells; however, the battery pack is not limited to use with solid-state cells and may be used with a variety of cell types where it may be advantageous to provide a controlled force on the cells. It should be noted that the term stack is not meant to refer to a vertical orientation or that the battery cells are stacked on top of each other, but rather is meant to refer to a plurality of battery cells, which may be pouch cells, positioned adjacent each other in a battery pack.

Figure 2:
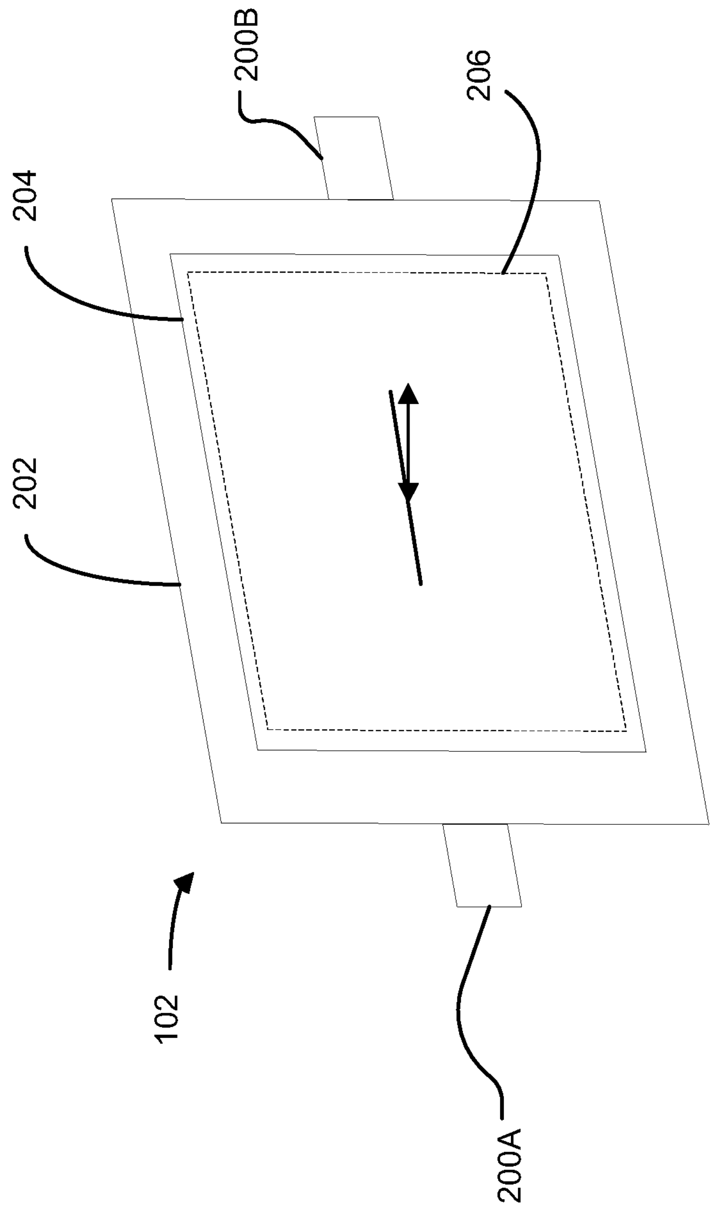
FIG. 2 is a representative isometric view of one possible example of a solid-state pouch cell.

FIG. 2 is a representative isometric view of one possible example of a pouch cell 102. The pouch cell is generally rectangular in shape with conductive tabs 200A and 200B extending from each end of a respective cell. In another arrangement, a pair of conductive tabs may extend from the same side of the cell. The conductive tab 200A from one end of the cell is connected with the anode (or often anodes) of the cell, often at a current collector(s) forming part of the layered structure and in electrical contact with the anode, and the conductive tab 200B at the other end of the cell is connected with the cathode (or often cathodes) of the cell, also at a current collector(s), which also form part of the layered structure and are in electrical contact with the cathode. Pouch cells may be of varying configurations, shapes and sizes. In the representative example shown, there is a border area 202 where the outer flexible pouch material layers encapsulating the layered cell structure within is bonded and seals the layered structure within. The portion of the pouch at the inner layered structure 204 is relatively wider than the sealed area and is the portion of the pouch subject to expansion and contraction from the battery cell 206 within, with the direction of expansion and contraction represented by the arrow illustrated perpendicular to the outer face of area 204. Generally, the anode is the negative electrode of the cell, and the cathode is the positive electrode of the cell. As noted already, the battery pack system is useful with a variety of different cell types including various different types of solid-state cells. Generally speaking, each cell has some specified open circuit voltage and capacity (often specified in Ah (amp hour)). In a battery pack, cells are interconnected in various possible series and parallel arrangements to provide the overall pack voltage, capacity and charge/discharge current characteristics of the system the pack is powering.

In FIGS. 1A and 1B, and others, the respective cells 102 are shown in top view with separators 106 between each pouch cell. Note, the pouch cells illustrated in the figures, including FIGS. 1A and 1B, are represented as planar rectangles in the various views but it should be noted that the wider area, such as area 204 of FIG. 2, is not shown to not overly complicate the figures. The tabs 200A,B (not shown in FIGS. 1A and 1B) of the various cells are connected to respective power rails. Of note, tabs and power rails extending from the cells may not be illustrated in all of the views to not over complicate the views. Moreover, while power rails are referred to as being positioned along either side of the pack adjacent the tabs, power rails may be arranged in other positions and similarly tabs may extend from other parts of any particular type of pouched cell.

The cells 102 are positioned between a first end plate 108 and a second end plate 110. The end plates may be planar. In alternative examples, particularly in configurations that may experience wide pressure ranges and high pressures, e.g., 50 PSI to 1500 PSI, the end plates may include reinforcing structures to prevent or eliminate bending or other deformation. In other examples, the end plates may define some preset counter curve that deforms and flattens into a planar orientation under the battery stack pressure forces applied by the system. In one example, one or both end plates may be box end plates. The end plates, or more generally retaining members, capture the collection of pouched battery cells, and as will be discussed in more detail throughout, and maintain force (pressure) on the collection of the cells by being controllably moved inwardly toward each other as the cells are discharged and their volumes are decreasing or by being controllably moved outward away from each other as the cells are charged and their volumes are increasing. In essence, the collection of cells between the plates are squeezed by and between the end plates at a controlled force to maintain the appropriate force/pressure on the cells while they are expanding and contracting during charging and discharging cycles. The end plates maintain consistent pressure across the facing surface of the cell that is arranged parallel and adjacent each plate, which pressure is translated through the parallel positioned pouch cells between the end plates, and maintain that consistently across a spectrum of possible changes to the same.

The end plates are movably supported within the battery pack 100. In the example of FIGS. 1A and 1B, as well as others discussed below, there are drive rods 112A, 112B positioned along the sides of the battery pack between the end plates. In one example, there are four rods positioned between respective corners and extending longitudinally between the rectangular end plates. The third and fourth (lower) drive rods are not visible in the top view. The drive rods, in one example, include threaded portions 114A, 114B that are supported in respective threaded portions of apertures 116 defined at the four corners of rectangular end plates (or threaded nuts mounted (e.g., welded to the end plates) coaxially with the apertures). By rotating the threaded drive rods, the end plates may be driven inwardly toward each other and outwardly away from each other.

In one example, each drive rod has a first threaded portion 114A and a second threaded portion 114B. The first threaded portions of the drive rods engage the first plate 108 and the second threaded portions of the drive rods engage the second plate 110. Both threaded portions are generally helical and by rotating the threaded drive rods, the end plates move by engaging the corresponding threads in the respective apertures (or drive nuts). The first threaded portion is threaded oppositely the second threaded portion. Having opposite threading, rotating the drive rod in one direction can move the plates in inwardly, and rotating the drive rod in the opposite direction can move outwardly. In the view of FIGS. 1A and 1B, rotating the drive rods in one direction will move the left box end plate 110 right (inwardly) and the right box end plate 108 oppositely left (inwardly). Rotating the drive rods in the opposite direction will move the left box end plate 110 left (outwardly) and the right box end plate 108 oppositely right (outwardly).

In general, the end plates will move between a maximum separation distance (outwardly) and a minimum separation distance (inwardly). The range of separate distance is established to at least accommodate the range between the maximum and minimum width change that the collection of cells will experience between a fully charged and fully discharged state. Depending on the extent of any charge or discharge cycle, the end plates may be moved to some lesser extent than the maximum or minimum separation distances. Nonetheless, the first and second threaded portions of each tie rod should be of sufficient length to accommodate the maximum and minimum separation between the plates in any given pack arrangement of cells. The drive rods may be evenly subdivided with half the drive rod including the threaded portion 114A and the other half including threaded portion 114B; however, the threaded portions may only extend sufficiently to accommodate the amount of plate movement, and/or may not be evenly sized, in various embodiments. In some of the various embodiments discussed herein, both end plates are moved inwardly or outwardly to maintain appropriate pressure on the cells. However, in some arrangements, it may be sufficient to fix one plate and move the other to accommodate expanding and contracting cells. In such an arrangement, separation between end plates to accommodate cells expansion and contraction is achieved by moving only one plate. In such an arrangement, one plate may include threaded apertures, nuts, threaded inserts, or some other threaded arrangement, and the other plate may include a bearings or other structures to support the rods.

To maintain relatively even force (pressure) on the cells as applied by the end plates, the end plates are arranged and maintained in parallel to each other and the pouches are arranged such that the relatively planar portions of the cells facing the respective end plates are also generally parallel to each other and the end plates. In one example, the plates are maintained in such an arrangement by the tie rods in each corner. The thread pitch is the same between the four drive rods and respective apertures hence even rotation of the drive rods evenly moves the respective plates. As such, the respective planes of the plates facing inwardly toward the cell are parallel and that parallel orientation is maintained as the plates are moved inwardly and outwardly, and the parallel planar maintenance maintains even pressure distribution on the cells. In addition, the end plates may include one or more guide members that are supported in guide rails 120 positioned under and above the pouched cells in the pack, to either side of the pouch cells or in the side walls of the pack, or in other possible arrangements as well as other possible guide structures. The guide members may be planar and fit within a guide slot of the guide rail, or the guide member may define a slot and the guide rail be a planar member. In either arrangement, the cooperation of the guide member and guide rail (or members and rails as the case may be) maintains the end plate in a consistent plane perpendicular to an axis of movement inwardly and outwardly to reinforce consistent pressure on the stack of cells squeezed between the plates.

In various examples, the drive rods are driven by a drive unit 118. Generally speaking, the drive unit turns the respective drive rods responsive to a determination of the force needed to be applied to the cells. The drive unit is in communication with a controller 122. The controller may receive sensor or other information indicative of various parameters including pressure, force, temperature, pack position, and/or other parameters, and include control processes to move and position the plates to provide pressure on the cells within the pack.

Figure 3A:
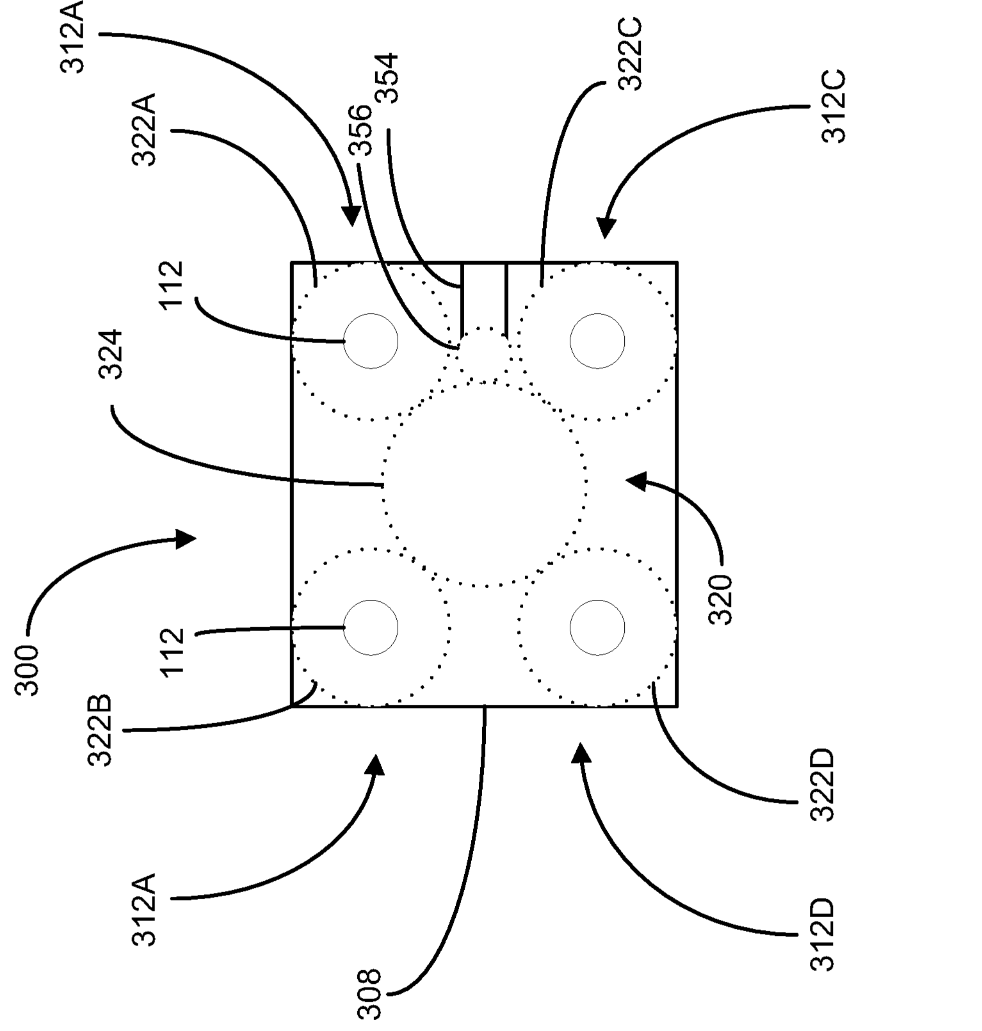
FIG. 3A is a front view of a planetary gear drive assembly to turn drive rods in one embodiment.
Figure 3B:
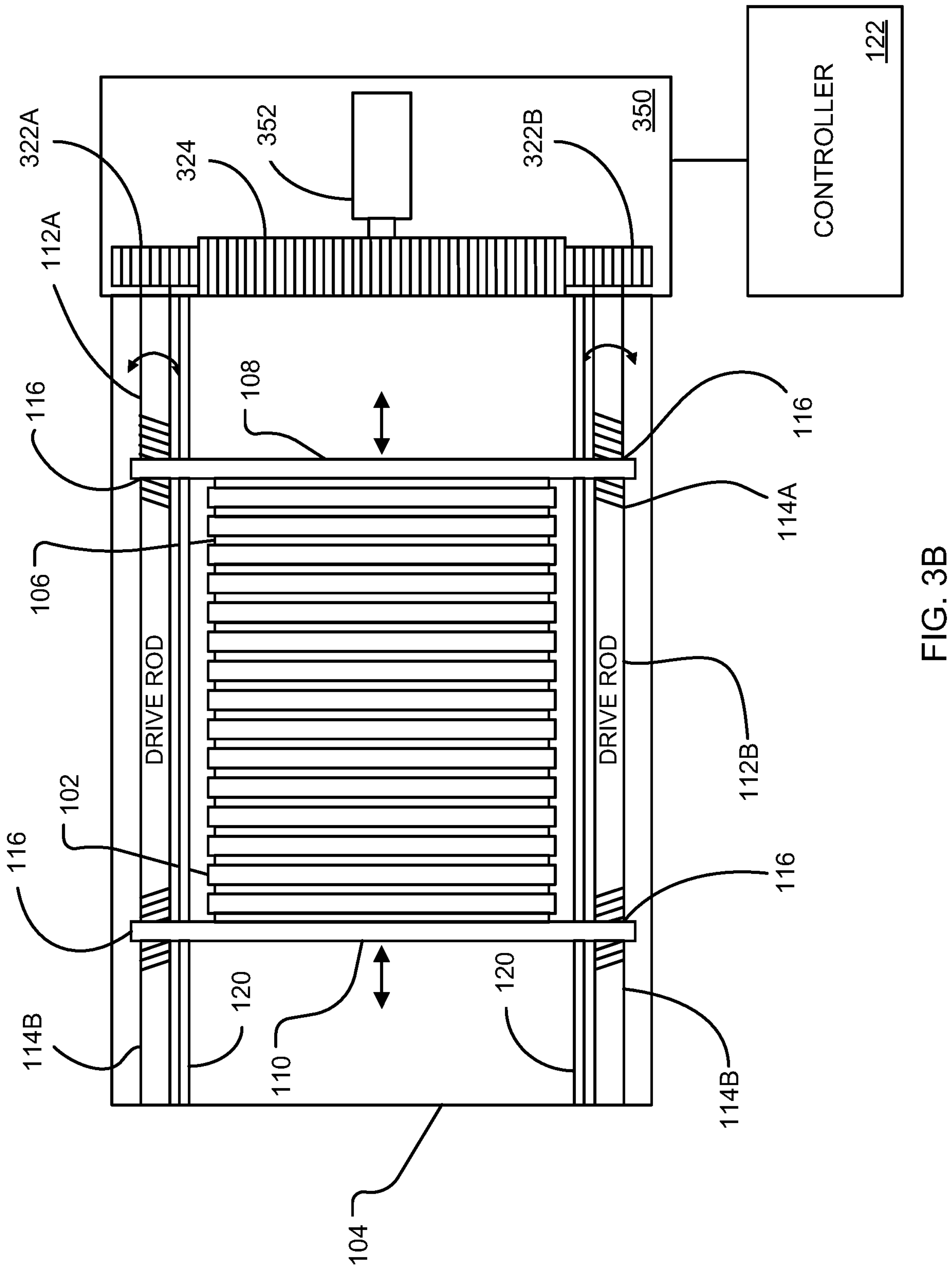
FIG. 3B is a side view of a battery pack employing a planetary gear drive assembly.

FIG. 3A illustrates a front view one possible example of a drive unit 300. FIG. 3B is a side view of an alternative drive unit 350. FIG. 3B further illustrates an internal portion of a battery pack including a plurality of stacked pouch cells 102 separated by compliant pads 106 and compressed by a threaded tie rod 112 and end plate 108, 110 configuration driven by the drive unit 350. The drive unit may be positioned at one of the end plates on the side of the end plate opposite the stack of cells. The drive unit, in the embodiment of FIG. 3A, comprises a planetary gear system 320 with planet gears 322A-322D coupled with respective drive rods 312A-312D. In the example of FIGS. 3A and 3B, there are four planet gears for the respective four drive rods. A sun gear 324 is positioned to engage and drive a planet gear. It should be noted that some definitions of conventional planetary gear systems involve planet gears that rotate about the sun gear; however, in the various embodiments discussed herein, the planet gears do not rotate or orbit the sun gear. In the illustrated embodiments of FIGS. 3A and 3B, the four planet gears are driven by the single sun gear 324. The planet gears are positioned axially with each drive rod 112 and may be coupled to each drive rod such that rotation of the planet gears rotates the respective drive rods, and rotation of the gears and hence the drive rods is the same thereby causing even planar movement of the end plates 108, 110 inwardly and outwardly consistent with helical consistency between the threading on the rods. Additionally, each planet gear is of the same size and hence rotation of the sun gear evenly rotates each planet gear facilitating the maintenance of the planar parallel orientation of the end plates mentioned above.

The planet gear assembly arrangement of FIG. 3A is shown with an equidistant relationship between the planet gears both vertically and horizontally. As such, the planet gears are also equidistantly distributed around an outer diameter of the sun gear, which engages each planet gear. In such a symmetrical arrangement, it may enhance driving the planet gear with a single motor due to uniform distribution of forces to each drive rod by way of the respective planet gear. Because there may be large forces involved, up to 1500 PSI possibly for some cells, the arrangement may become advantageous particularly where a single motor is involved and space for relatively larger powerful motors is not available, practical, or to be avoided for other reasons. FIG. 3B shows a similar arrangement albeit with non-equidistantly spaced planet gears. The sun gear is powered to rotate the respective planet gears. In one arrangement, the sun gear may be directly driven by a motor 352 axially connected to the planet gear axle, as shown in FIG. 3B. Alternatively, and as shown in FIG. 3A, a motor 354 is positioned adjacent the planet gear. The motor 354 comprises a drive gear 356 that engages the planet gear 324 to rotate the same. The adjacent arrangement provides for the possibility of situating the motor assembly in a relatively smaller area as compared to one in which the motor is directly coupled with the sun gear axle. The motor and drive gear may be positioned between any of the respective planet gears. If the motor and its drive axis is positioned transverse the sun gear, the motor may include a worm style drive gear to engage the sun gear.

As noted, rotation of the planet gears rotates the drive rods, which act to drive the plates inwardly or outwardly. However, pressure from the cells between the plates will push on the plates more or less depending on whether the cells are expanding or contracting. In an embodiment using a worm gear to drive the sun gear, holding force from the motor is not required because the worm gear cannot be back-driven. Namely, pressure from the plates translated back to the sun gear through the planet gears, will not rotate the worm gear. In this way, when the battery pack is not being charged or discharged and hence will not be expanding or contracting, a pressure may be set by positioning the plate to maintain pressure on the stack of cells but power may be removed from the system (e.g., the motor need not be powered to maintain the pressure) when the pressure is set because pressure from the cells on the plates will not back-drive the worm gear.

Figure 4:
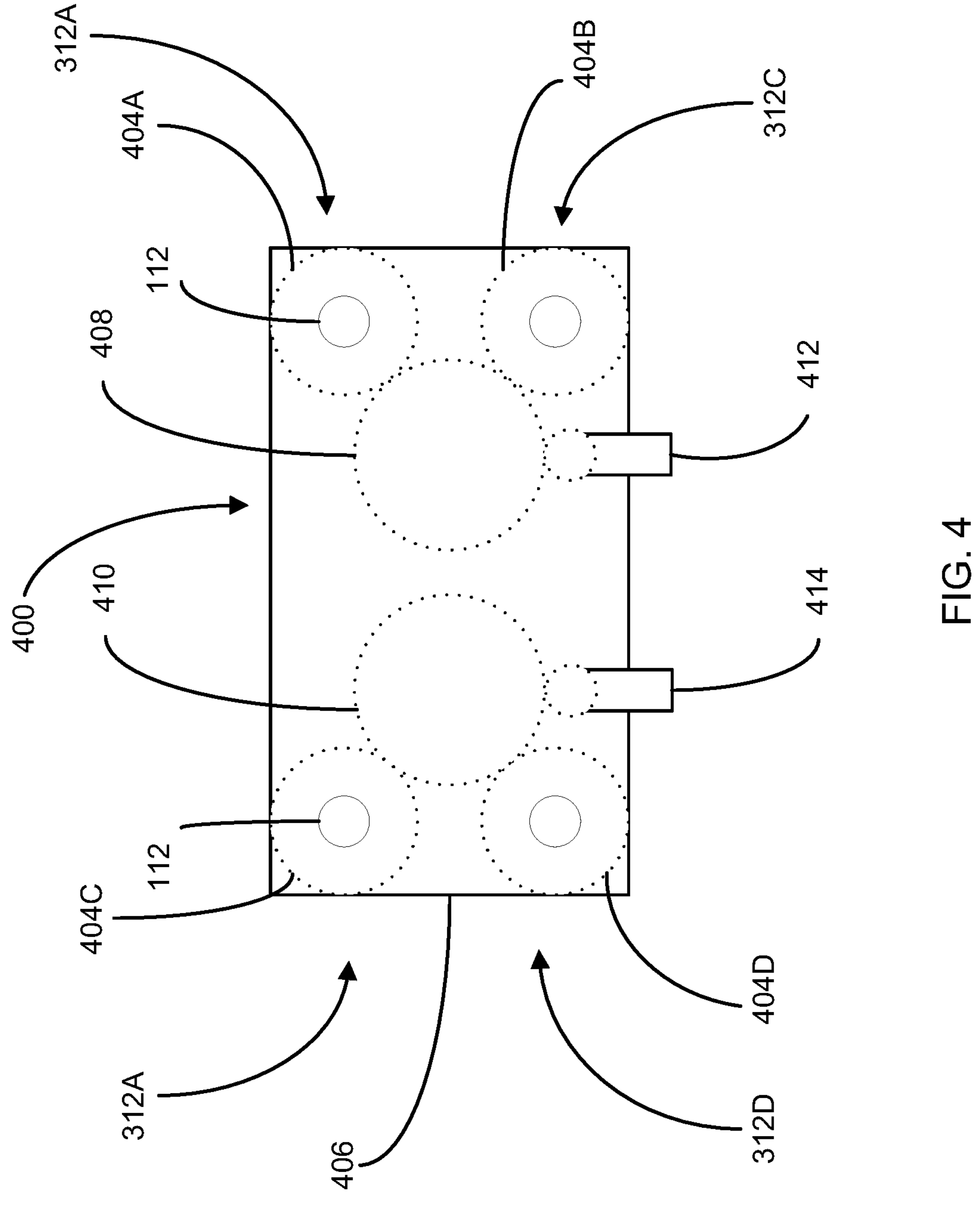
FIG. 4 is a front view of an alternative planetary gear assembly to turn drive rods in one embodiment.

FIG. 4 illustrates an alternative planetary gear arrangement 400 for the drive unit. Namely, like shown in FIGS. 3A and 3B, there is a planet gear for each drive rod. However, a first pair of planet gears 404A, 404B to one side of a box end plate 406 is driven by a first sun gear 408 and a second pair of planet gears 404C, 404D at the opposite side of the box end plate 406 is driven by a second sun gear 410. Each sun gear is driven. In one example, a first motor 424 may be positioned to directly drive the first sun gear 408 and a second motor 414 may be positioned to directly drive the second sun gear 410. Alternatively, the sun gears may be driven by respective drive gears. Each drive gear may be driven by a single motor driving a third drive gear (not shown). Alternatively, the sun gears are each driven by respective drive gears, each powered by respective motors. In yet another alternative, a worm gear may be positioned between the sun gears and engage each of the same to rotate each.

Generally speaking, the embodiment of FIGS. 3A and 3B may be used with a square or nearly square end plate configured to engage similarly square or nearly square pouch cells. With that said, it is possible to deploy a square end plate configuration with rectangular or other shaped pouch cells. The embodiment of FIGS. 4, on the other hand, may be used with more rectangular elongate pouch cells and a correspondingly more elongate rectangular end plates. Generally, the shape and dimension of the end plates corresponds to the side shape and dimension of the pouch cells to provide relatively even pressure on the cells across the side surface area of the cells, which is beneficial for even pressure distribution and to optimize the overall size of a pack, among other benefits. However, it should be noted, that the plates may be sized and shaped based on the cell shape, among other things, that are being pressurized in any given arrangement and need not correspond to the shape in the ways described. Moreover, in some configurations, it may be beneficial for the plates to be larger than the cells to ensure that pressure is distributed relatively evenly across the entirety of the pouch surface related to the surface of the internal cell and not differentially concentrated across the internal cell.

Figure 5A:
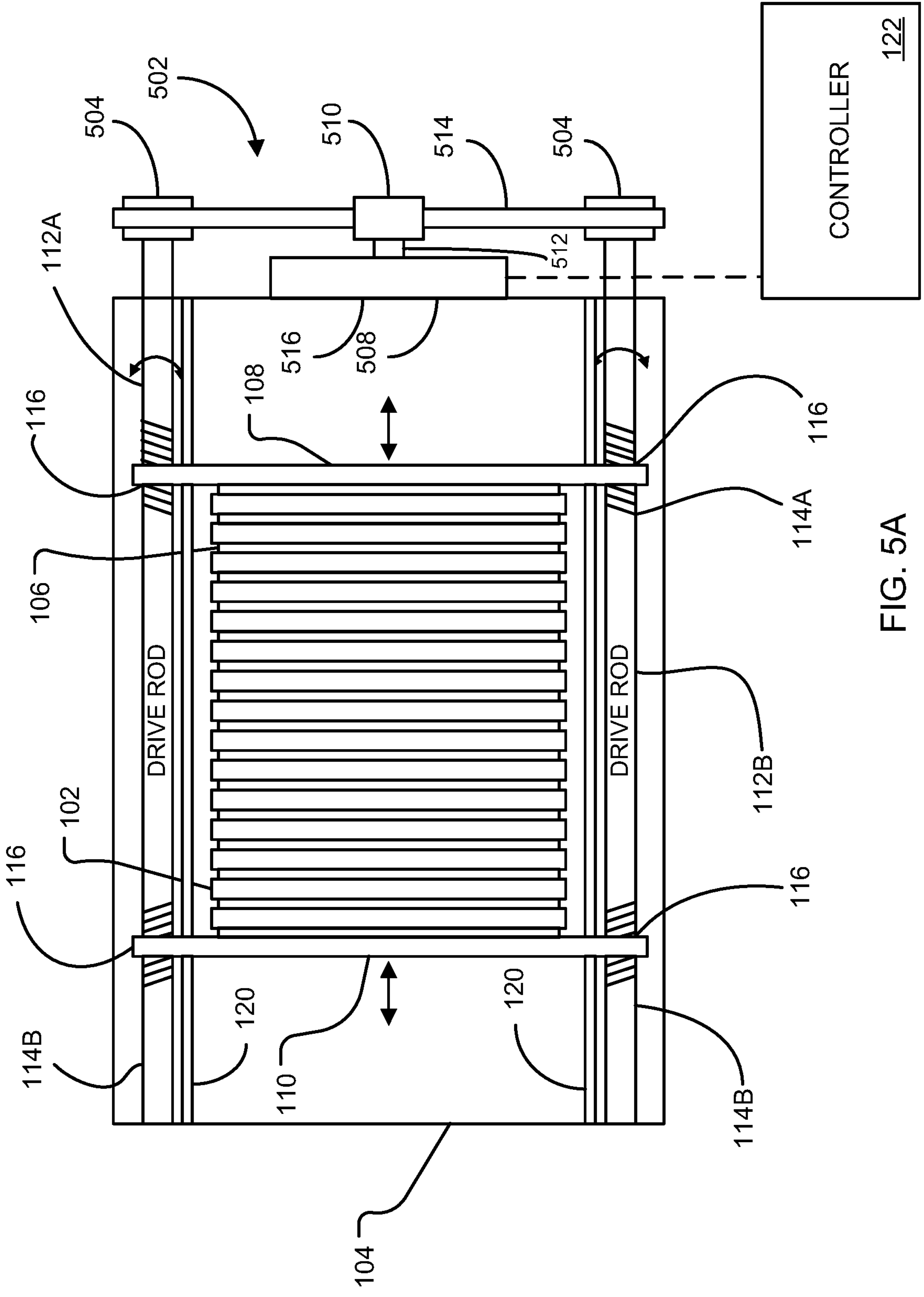
FIG. 5A is a representative top view of a battery pack including translationally supported end plates positioned and supported to provide pressure on pouch batteries arranged therebetween, the end plates being movably controlled to provide force on the battery cells, the end plates driven by a pulley system relatively inwardly or outwardly to maintain force on pouch batteries between the plates.
Figure 6:
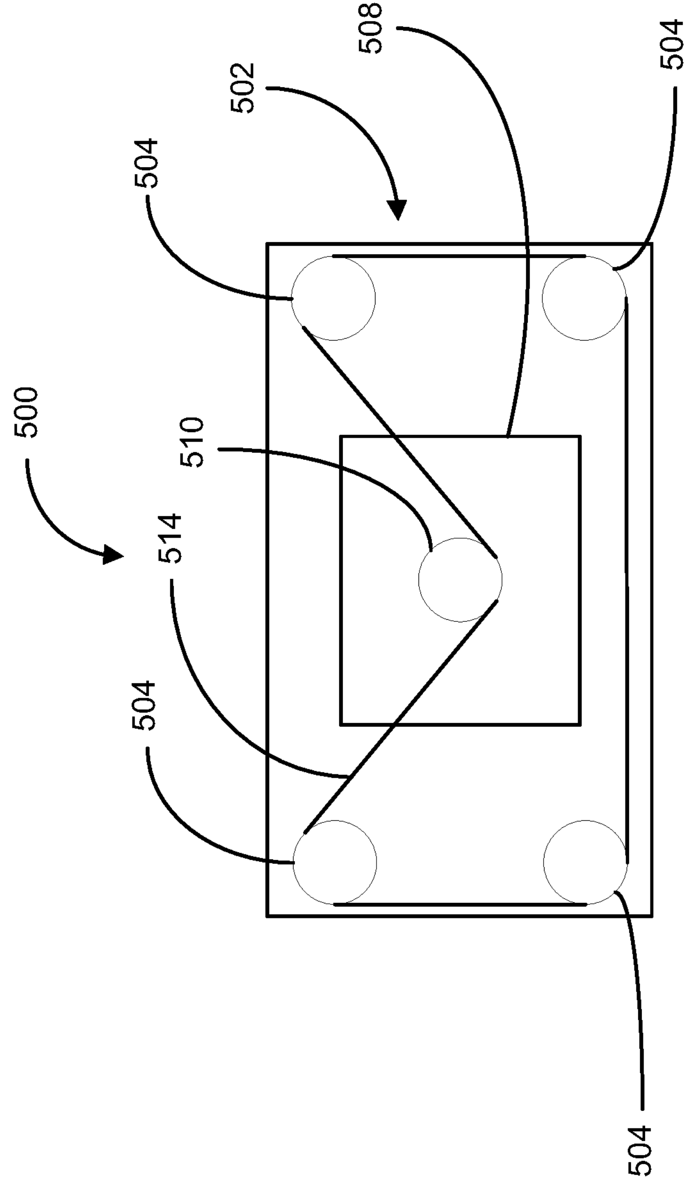
FIG. 6 is a front view of the pulley system of FIG. 5A.

FIG. 5A is a top view of a battery pack 500 having an alternative drive unit assembly 502, shown in side view in FIG. 6, in the form of a belt and pulley assembly. These are shown with the pack depicted in FIG. 1A. However, it should be recognized that the alternative drive unit may be used in other pack configurations, like other drive units discussed herein. In this arrangement, a pulley 504 is positioned at one end of each drive rod 112. The pulley may be integrally formed at an end of the drive rod or operably coupled with the same. Regardless, rotation of a respective pulley rotates the respective drive rod, which in turn moves the end plates 110 and 108 inwardly or outwardly.

In one example, a motor 508 is positioned between the respective pulleys and includes a drive pulley 510. The drive pully and drive rod pulleys are shown with the same diameter; however, the drive pulley may be larger or smaller than the drive rod pulleys depending on the torque required, motor characteristics, and other factors. The motor includes a shaft 512 to rotate the drive pulley. A belt 514 is positioned around the respective pulleys and the drive pulley such that rotation of the drive pulley drives each tie rod pulley by way of the belt. A belt tensioner may also be included but is not shown. In this example, the motor is fixedly secured adjacent the maximum outward extent of one of the end plates 108. In one specific example, the motor is a pancake motor and it is mounted on a plate 516, which may be an outer side wall of the battery pack housing, where the plate is positioned at or outside the maximum outward extent of one of the end plates. The motor may also be mounted on some other frame assembly. The drive rods, as discussed above, are threaded and engage a correspondingly threaded structure 116 of the respective end plates to translate the end plate or plates inwardly or outwardly by rotating the rods. The drive rods extend through the support plate 516 securing the motor and support respective pulleys 504 at the ends of the rods with the pulleys planarly aligned with the drive pulley secured to the axle of the motor. The axle may be cantilevered from the motor or an end area of the drive axle may be supported in a bearing structure to reduce side loading on the shaft and motor. In an alternative arrangement, the bearing structure may be in the support plate instead of mounting the motor on the support plate, and the motor mounted to a pack surface, bracket or the like, such that the axle extends outward toward the support plate and the drive pulley is between the motor and the support plate. Regardless, the drive pully is planarly aligned with the drive rod pulleys.

In an alternative arrangement, the drive shaft extending from the motor may be a splined shaft to form the drive pulley or, as shown, a distinct drive pulley is used depending on the torque requirements from the drive pulley relative the drive axle diameter. In either case, the belt 514 may be toothed, single sided or double sided depending on the routing around the drive rod pulleys and drive pulley. The drive pulley may similarly be toothed to engage the toothed belt. Such a toothed system may be used to maintain consistent application of torque on the pulleys by the belt and avoid slip therebetween.

Figure 5B:
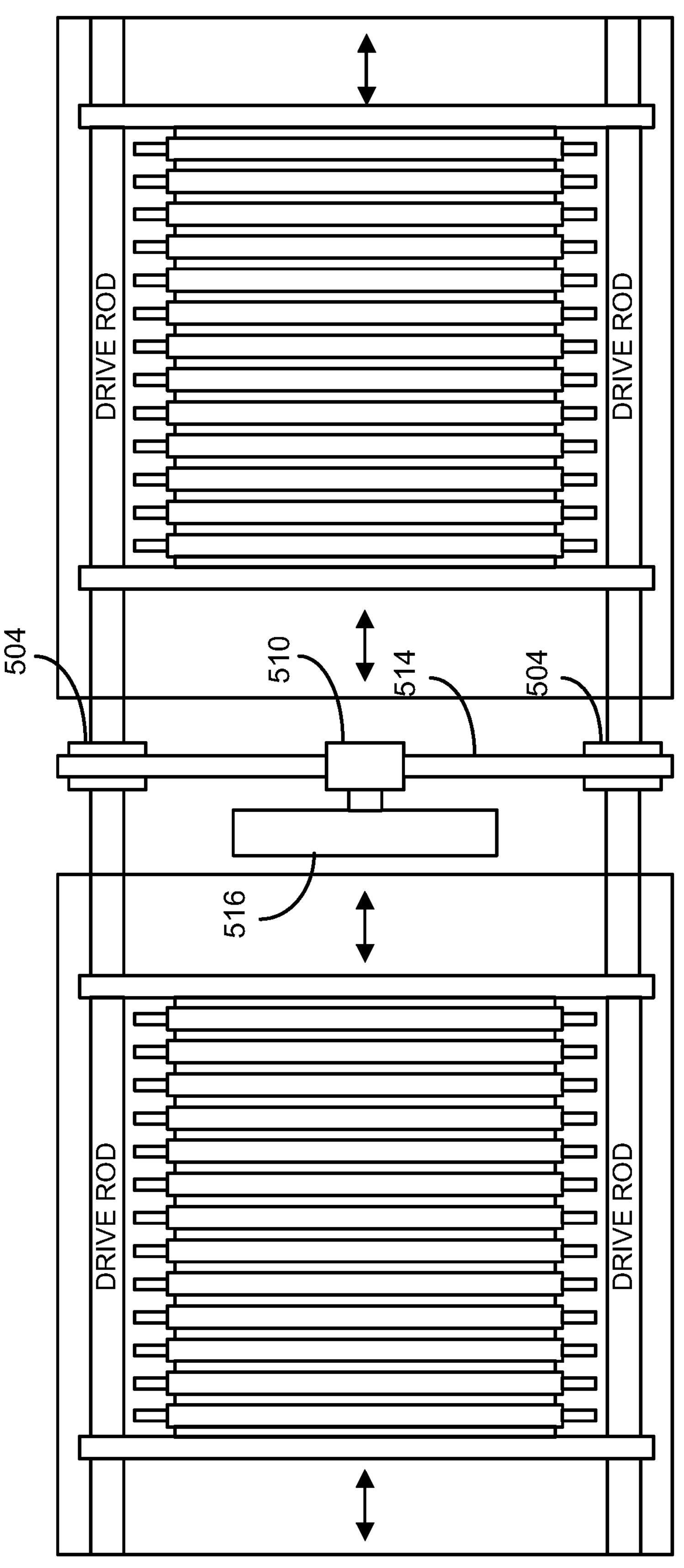
FIG. 5B is a representative top view of a battery pack with opposing battery modules each including translationally supported end plates positioned and supported to provide pressure on battery cells arranged therebetween, the end plates being movably controlled to provide force on the battery cells, the end plates driven relatively inwardly or outwardly to maintain force on the plates by a pulley system operably coupled with both battery modules.

FIG. 5B is an alternative embodiment where the drive unit assembly of FIGS. 5A and 6, is used to provide pressure to a pair of battery packs. In this example, each pack may be like depicted in FIG. 1A, albeit with various details not shown in FIG. 5B. The pulleys of the drive unit are coupled with pairs of drive rods, with one member of the pair from one pack and other member of the pair from the other pack. As such, one drive unit is positioned to control the plates in respective packs and provide controlled pressure to the battery cells in each pack.

Figure 7:
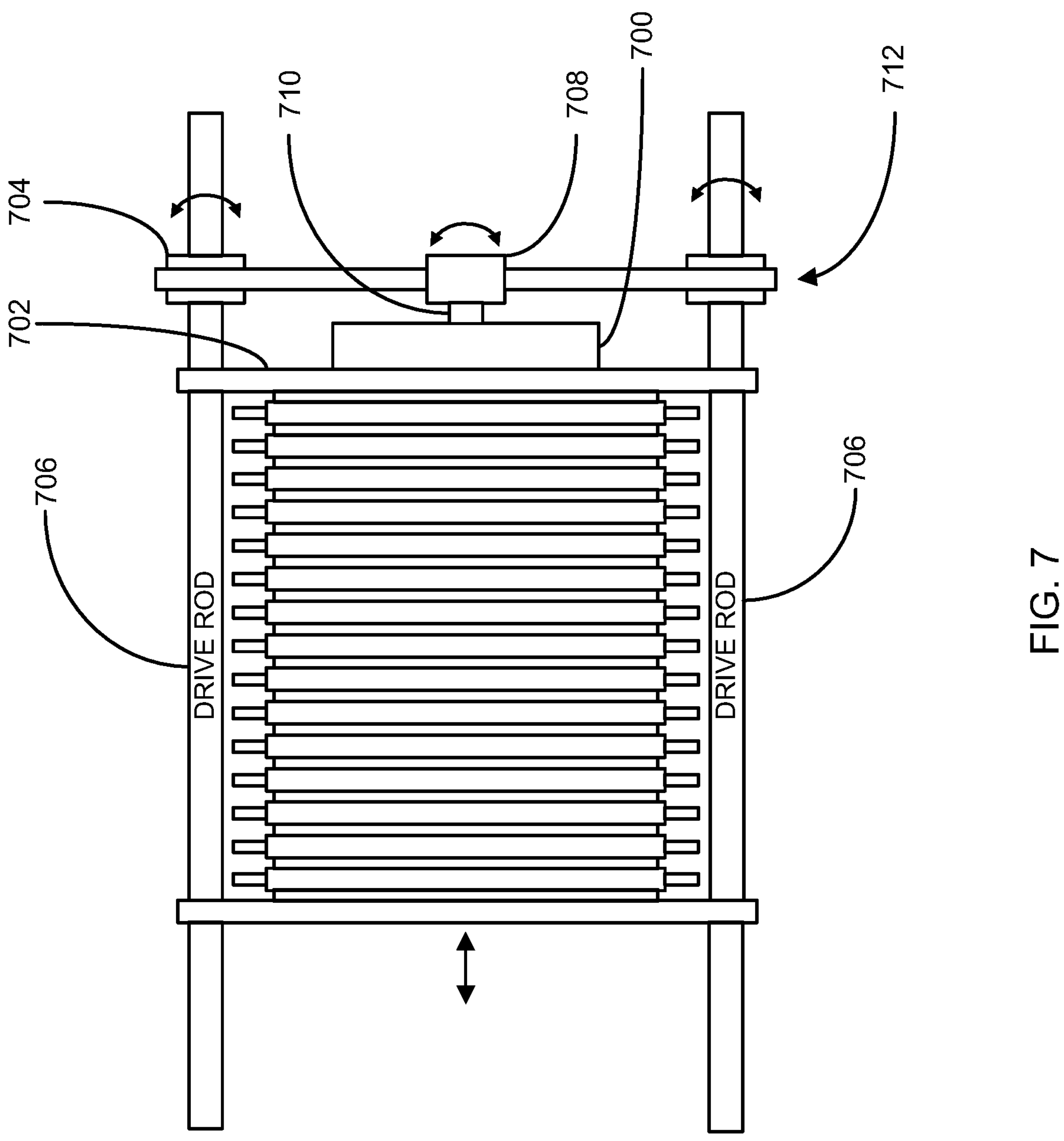
FIG. 7 is a representative top view of a battery pack with battery cells including translationally supported end plates that are movably controlled to provide force on the battery cells, the end plates driven relatively inwardly or outwardly to maintain force on the plates by an alternative pulley system.

In an alternative arrangement shown in FIG. 7, a further alternative drive unit assembly includes a motor 700, which may be a pancake motor, mounted on an end plate 702. As such, as the end plate moves inwardly or outwardly, the motor moves with the plate. In such an arrangement, the drive pulleys 704 may be mounted on the respective drive shafts 706 to both turn the drive shafts as well as move laterally inwardly and outwardly along the respective drive shaft. The drive pulley 708 may be similarly mounted on a splined motor axle 710. The drive rod pulleys as well as the motor (drive pulley) may be captured in a frame assembly 712 to maintain a planar alignment therebetween. The frame assembly may be translationally supported by way of a guide rail system or may be free floating and supported by the respective drive rods and pulleys. In such an arrangement, as the motor moves inwardly and outwardly being carried by an end plate, the pulley assembly is similarly moved and the drive rod pulleys move inwardly or outwardly along the respective drive rods with the end plate.

In another alternative arrangement, the drive rod pulleys are supported by the pulley assembly and fixed in position. In such an arrangement, the drive shaft along the lateral extent of pulley movement, may include a splined shaft section to accommodate lateral movement of the drive pulley as well as rotate the shaft while the pulley is rotated. Here, as the motor translates inwardly and outwardly, and thereby moves in relation to the respective drive rod pulleys, the drive pulley may move along the drive shaft and maintain alignment with the drive rod pulleys. The motor axle may also be telescoping if the amount of lateral movement and spacing otherwise needs greater lateral movement than a splined axle alone may accommodate. Alternatively, the axle may be telescoping, and the pully fixed to the axle with movement of the motor relative to the drive rod pulleys accommodated by the telescoping drive axle. The use of a telescoping axle to the drive pulley may also accommodate a smaller space and thus allow for a more compact overall design.

In another alternative embodiment, the drive pulley may further include a coaxial drive gear operably coupled with a worm gear powered by a motor. Such an arrangement may provide a similar ability to not be back-driven and not require power to maintain a static equilibrium position. Other pulley systems may include some form of mechanical brake that is actuated on power down of the system so that there is not a need to maintain power to the motor, for example when a vehicle is parked and not plugged into a charging station. A mechanical brake may take various forms and connect with various parts of the pulley system controllably moving the plates or directly engaging the plates. In general, the mechanical brake may include a feature that causes engagement to restrict movement of the plates when not under power and involves releasing the brake under power. For example, various spring-loaded brakes may be used where the spring biases a brake member into engagement and is operably retraced to disengage when powered or otherwise when commanded. The retraction of the brake member may be done mechanically, electrically, magnetically, electromechanically and through other variations, alone or in combination.

In the various embodiments, the system may further comprise some form of load measuring system such as a load cell or load cells, strain gauge or strain gauges, or other mechanisms by which the force being applied by the end plates on the captured cells may be measured and form part of a feedback loop by which the various drive mechanisms are controlled to adjust the position of the plates. While the term force is used herein to describe the various load measuring arrangements, the term is meant to also encompass other possible measurements including torque and pressure. As such, other sensors may be used such as pressure sensors. Further, force may be measured or derived from other measurements. Force (pressure) may also be a computed through measurement of position, derived from motor control measurements, plate position, derived from motor position, and the like. It is also possible to characterize a battery system sufficiently that state of charge, temperature, and other factors may be used to determine the position of a plate to provide the necessary pressure on the pouches to provide optimal operation. In the various possibilities, the plate position or plate positions, relative to one another, is based on the compressive force and pressure being applied to the cell stack between the plates.

In one embodiment, a strain gauge is affixed to one or more of the tie rods to correlate axial compression or extension, and more generally displacement, of the tie rods with force on the end plates. In another example, a strain gauge may be positioned to measure rotational torque on the tie rods and correlate such rotational torque with force on the end plates and similar pressure across the surface of the pouch cells. Various forms of load cells are also contemplated. For example, one or more load cells may be positioned between one or both end plates and the first adjacent cell. Depending on the arrangement, an additional plate may be positioned inwardly from the end plate such that the additional plate abuts the first cell or a pad, and the load cell is positioned between the plates. In such an arrangement, flexible resilient pads may be positioned between the plates to maintain the additional inner plate in a planar arrangement with the outer end plate, to ensure even force distribution across the plane of the plates, while at the same time translating forces to the load cell therebetween.

Figure 8:
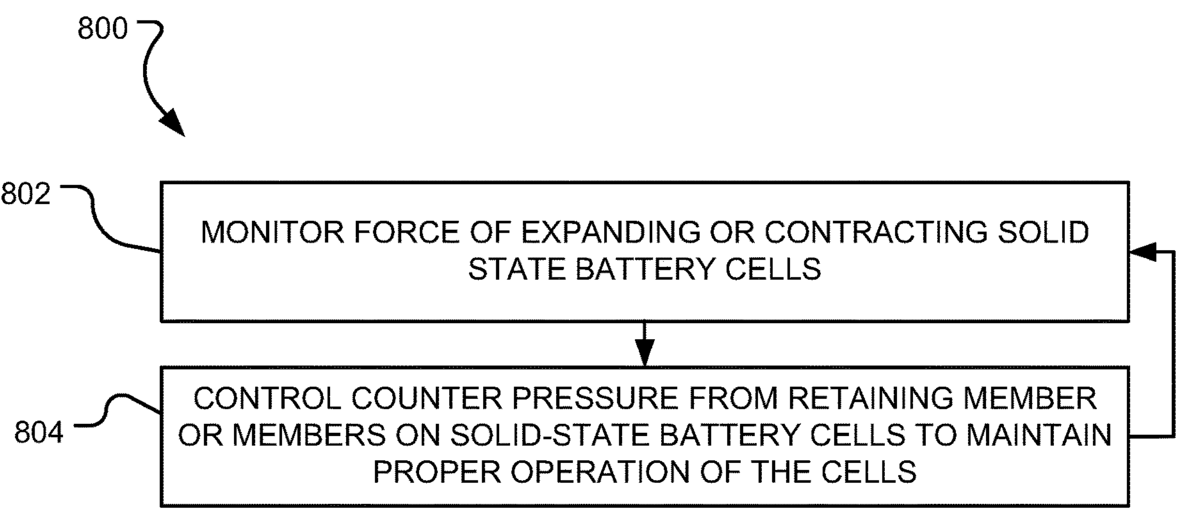
FIG. 8 is a flowchart depicting a method of maintaining pressure on a stack of cells, in one embodiment.

Regardless of the load measurement or load computation, or computational arrangement and referring to FIG. 8, a method 800 of controlling force on a stack of pouched battery cells involves the load measuring system obtaining the force from the cells on an end plate or the end plates (operation 802). In cases where the force/pressure is computed, the controller may both control the motor or motors or other mechanism controlling plate position as well as compute the pressure. The system may include some force or forces to maintain the cells. In some examples, the force may be a function of other conditions such as state of charge, temperature and the number of charge and discharge cycles. Thus, it is possible that the set force may change during the course of a charge or discharge cycle or over multiple cycles and may vary based on the type of cells. Regardless, the system obtains a force value or values, and controls the drive unit to maintain whatever the target force (operation 804). So, for example, if the cells of a pack are each expanding during a cycle, and thus collectively pushing outwardly against the end plates, an increasing force will be detected. As that force increases, the plate or plates, may be moved outwardly to accommodate the expanding cells and maintain the cells at the proper force or within some range of forces on the cells for proper operation. Similarly, as the cells contract in the opposing cycle and the force from the current position of the plates decreases, the plate or plates are moved inwardly to maintain pressure on the shrinking cells. The method may involve a feedback loop where the plate or plates are moved until the target force is achieved (e.g., iteratively adjusting the plate position until some target force is achieved).

Each cell may be electrically coupled to another cell to form a serial connection or parallel connection and/or may be coupled with a bus bar or other structure of the battery pack. Regardless of whether a cell is coupled with another cell or to a bus bar or possibly both, there is some accommodation to the cells moving relative to each other and relative to a bus bar to which the cells may be electrically coupled. As such, the cell tabs may be of sufficient length to accommodate movement whether the tabs of adjacent cells are interconnected or the tabs are welded or otherwise electrically connected to a bus bar. Alternatively, or additionally, a wire or some form of conductor may be conductively coupled with tabs of the respective cells and the conductor interconnected with an adjacent tab or the bus bar depending on the arrangement.

Figure 9A:
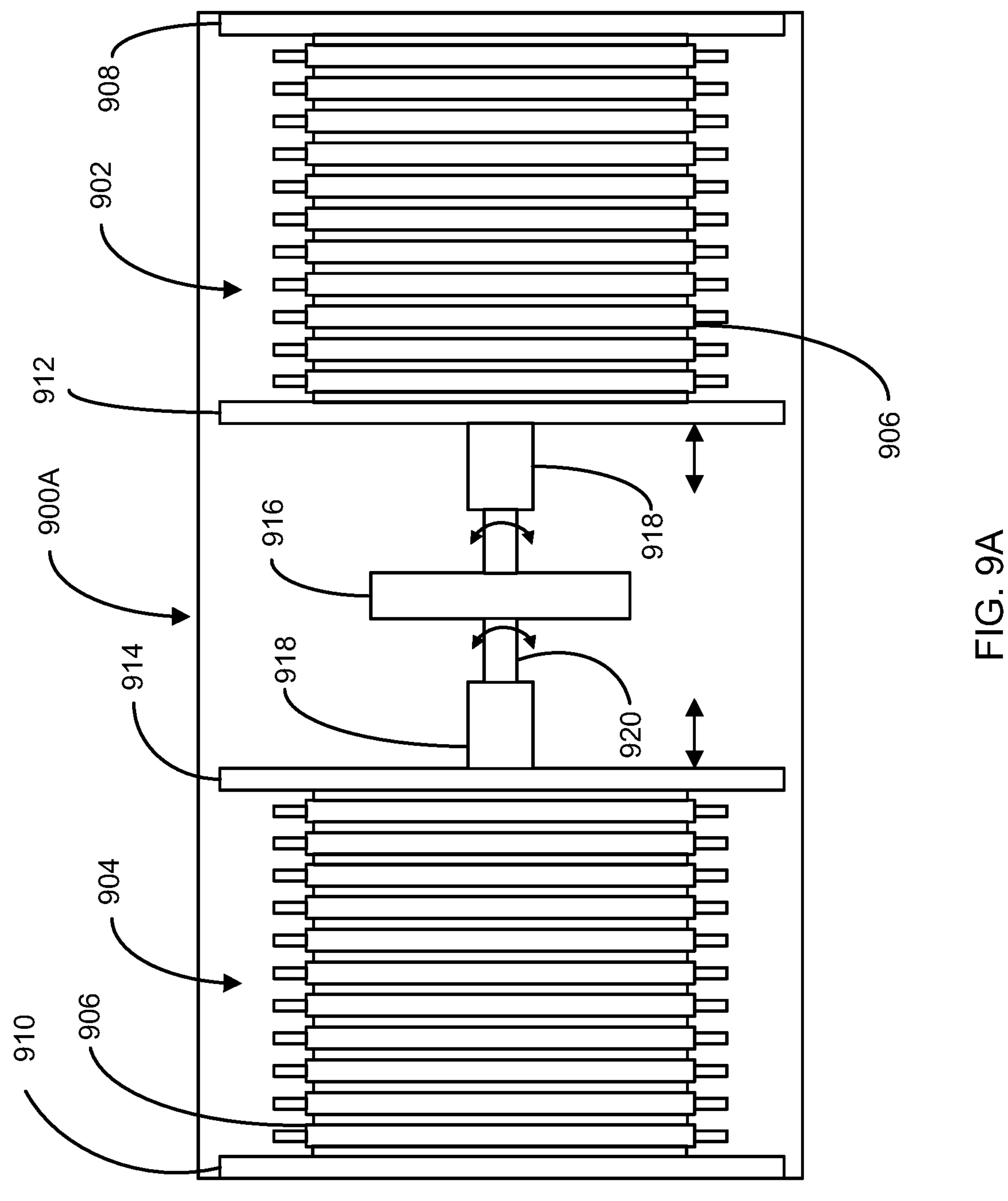
FIG. 9A a representative top view of a battery pack with cells including translationally supported end plates of respective pressure modules, the end plates translated to maintain pressure on the cells by way of a motor positioned between the pressure modules.

FIG. 9A-9D illustrate alternative arrangements of battery packs. Referring first to FIG. 9A, a battery pack 900A involves two battery pressure modules 902, 904 of stacked cells 906 within each module. The battery cells here, like other embodiments, may be solid-state cells or other cell types that benefit from maintaining pressure on the cell. In the illustrated embodiments, each module includes a fixed outer end plate 908, 910 and a movably supported inner end plate 912, 914. The fixed end plates may be distinct plates or may be an outer wall of the battery pack, in various embodiments. The respective inner movably mounted plates are facing each other with a drive unit 916 (or units) therebetween. In contrast, the embodiments illustrated above, other than the embodiment of FIG. 5B, can be considered as having a single battery pressure module with either one or two movably controlled pressure (or force) plates that are moved relatively inwardly toward each other or outwardly moved away from each other to maintain optimal pressure on the cells captured therebetween. Regardless, in the embodiment of FIG. 9A, the drive unit (or units) controllably drives each inner plate 912, 914 to maintain proper force on cells of each pressure module 902, 904.

In the example illustrated, it is possible to measure force on the cells of one or both battery modules. If the cell count and type is the same for each module, it may be assumed that the force needed for each battery pressure module is the same. Regardless, the system includes a force module or modules to obtain force on the cells. The motor may be controlled to maintain the proper force while cells are expanding or contracting within the respective battery pressure modules.

In the example illustrated in FIG. 9A, a threaded collar 918 is coupled with each movable inner end plate 912, 914, and the threaded collars are axially aligned. A motor 916 is positioned with a threaded motor drive shaft 920 extending from each side of the motor. The motor shaft is axially aligned with the respective threaded collars and dimensioned to engage the same. The threaded cooperation is such that rotation of the motor shaft drives each end plate away from the motor thereby maintaining appropriate force on the cells as they shrink or pulls the end plates toward the motor thereby maintaining appropriate force on the cells as they expand.

The motor may be a pancake type motor. It is also possible to drive each inner plate with its own motor. It is also possible to add compression springs to supplement the force provided by the motor or motors. For example, a compression spring may be positioned between the motor and each respective inner plate. The springs may be coaxially with the collars and shafts. It is also possible to include more than one spring engaging each inner plate. Moreover, a center wall parallel with each inner plate may be provided, and of a similar dimension and shape as the inner plates. Springs may be provided between the center wall and the respective inner plates, and the springs distributed at each corner. In the various possible arrangements of using a spring or springs engaging each inner plate, the springs would supplement the force on the inner plates provided by the motor or motors and would work in concert with the motors. Use of springs would allow the use of a relatively smaller motor as some portion of the overall force would be provided by the springs. The combination would also allow for relatively lighter weight springs to be used as compared to a system using only springs and would compensate, through a motor controlling the force, for the variable force profile experienced across the range of compression of the springs. In one possible example, springs providing a spring force less than a minimum required pressure on the inner plates would be selected. In such an arrangement, the springs would not possibly over pressure the cells, and the motor would account for the difference between the spring force and whatever force was needed to be applied to the respective stacks to maintain proper operation. Such an arrangement, through use of a smaller motor would use less energy as compared to an embodiment using only a motor.

Figures 9B, 9C, 9D:
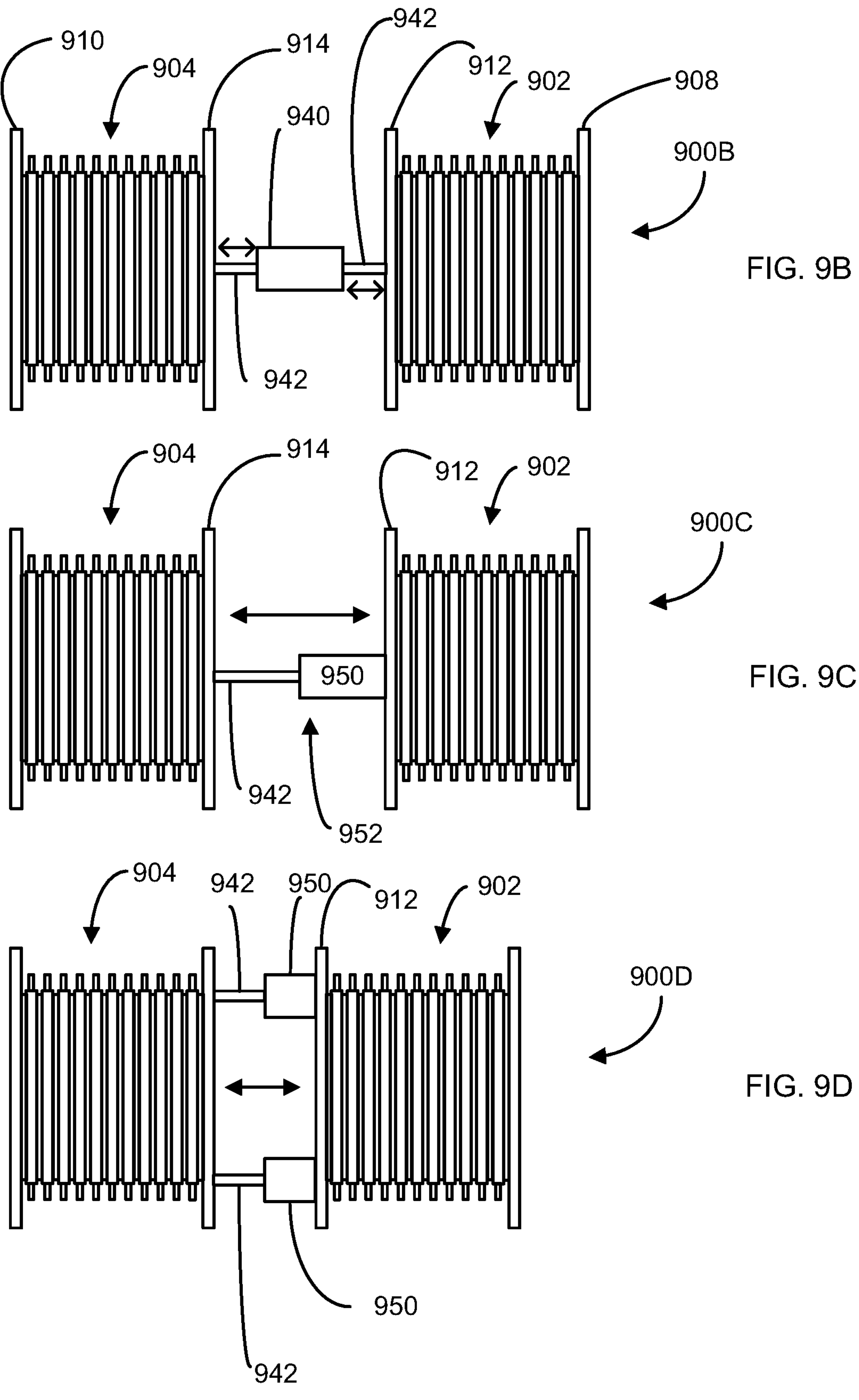
FIG. 9B is a representative top view of a battery pack including translationally supported end plates of respective pressure modules of the pack, the end plates translated to maintain pressure on the battery cells within the respective modules by way of a bi-directional piston actuator positioned between the pressure modules.
FIG. 9C is a representative top view of a battery pack including translationally supported end plates of respective pressure modules of the pack, the end plates translated to maintain pressure on the battery cells within the respective modules by way of a piston actuator mounted on one plate such it translates with the plate and the piston rod engaging an opposing plate so that the end plates of the respective modules each translate due to extension or contraction of the piston rod.
FIG. 9D is a representative top view of a battery pack including translationally supported end plates of respective pressure modules of the pack, the end plates translated to maintain pressure on the battery cells within the respective modules by way of a pair of piston actuators mounted on one plate such they translate with the plate and the piston rods engaging an opposing plate so that the end plates of the respective modules each translate due to extension or contraction of the piston rods.

FIG. 9B illustrates an alternative arrangement of a battery pack 900B involving two battery pressure modules 902, 904 of stacked cells within each module. The cells here, like other embodiments, may be solid-state cells or other cell types that benefit from maintaining pressure on the cell. In the illustrated embodiment, each module includes a fixed outer end plate 908, 910 and a movably supported inner end plate 912, 914. The fixed end plates may be distinct plates or may be an outer wall of the battery pack, in various embodiments. The respective inner movably mounted plates are facing each other with a piston assembly 940 therebetween.

The piston assembly may be any of a variety of possible pneumatic, hydraulic, electric, electromagnetic, and other devices that controllably drive a piston rod 942 or piston rods including, but not limited to, a linear actuator, stepper motor driven linear actuator, pneumatic cylinder, piston actuator, double acting actuator, etc. In the embodiment shown in FIG. 9B, the piston assembly may include two piston rods separately controlled to engage adjacent plates of each respective module. A piston assembly housing is mounted, which may be equidistantly mounted, between the opposing plates 912, 914 with piston rods extending from the housing to engage the adjacent plates of the opposing modules. Alternatively, there may be a first piston assembly with an associated piston rod engaging an end plate of one module and a second, distinct, piston assembly with an associated piston rod engaging an end plate of the opposing module. In another alternative, there may be two distinct piston assemblies positioned at outside ends of one plate (e.g., plate 912), and two distinct piston assemblies positioned at the outside ends of an end plate (e.g., plate 914) of the opposing battery module. In such an arrangement, the four piston assemblies are positioned in the space between the two battery modules (e.g., between modules 902 and 904). Such an arrangement may be used to size the piston assemblies to minimize the space needed between modules while at the same time providing the range of force needed for the pressure range of a given module. In such a case, with end plates mounted on respective guide rails to maintain a parallel position with the cells with the module, the two motors can provide force at each corner while maintaining parallel position of the end plates even if perfectly precise motor control is not achieved thereby maintaining even pressure distribution across the cells. Nonetheless, precise and common force control may be used to control each motor engaging a plate.

In an alternative battery pack 900C, shown in FIG. 9C, a housing 950 of the piston assembly 952 supporting a motor or other drive mechanism may be coupled with one plate 912 and positioned for the piston rod 942 to engage the opposing plate 914. In such an arrangement, the piston assembly housing moves with the plate to which its attached, and extension or retraction of the piston rod causes more or less force to be placed on the plates of the respective modules thereby providing more or less pressure on the cells within the respective modules. In such an arrangement, there is a single point of control to provide pressure to the two modules. The piston assembly of FIG. 9C is mounted \generally along a centerline between the plates; in an alternative battery pack 900D shown in FIG. 9D, the system may include two piston assemblies 950 mounted on and between opposing ends of an end plate 912 with the respective piston rods 942 engaging the respective end areas of the opposing plate 914 of the opposing module 904. Such an arrangement contemplates use of relative smaller piston assemblies to provide greater collective force, or can be used when smaller piston assemblies would be beneficial, e.g., for space consideration, but are insufficient alone to provide sufficient force. In such an arrangement, each piston assembly is synchronously controlled to ensure force at the ends of the plates are equal.

Figure 10:
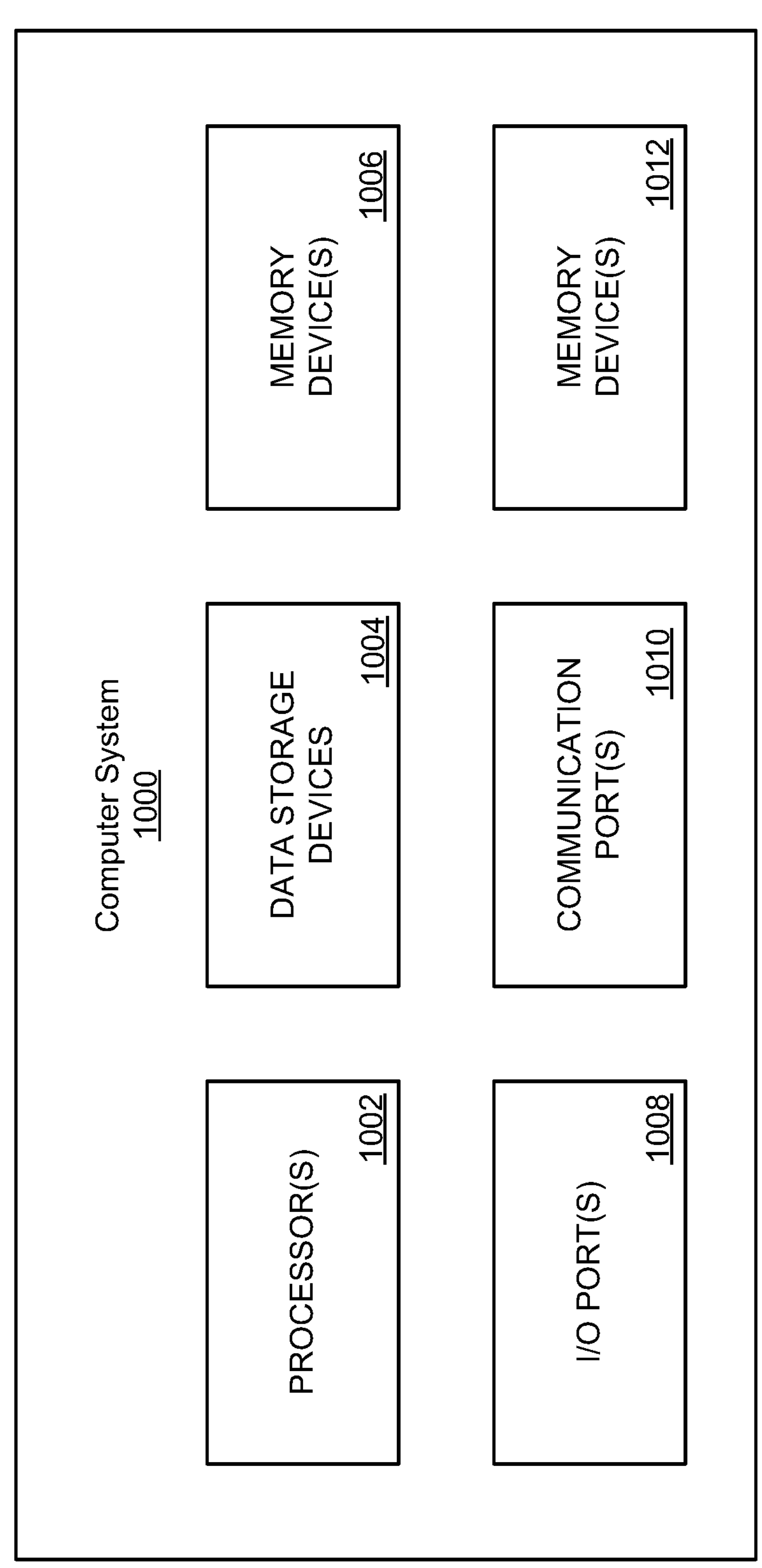
FIG. 10 is a diagram of computing system that may be used to provide control in the various arrangements described herein.

Referring to FIG. 10, a detailed description of an example computing system 1000 having one or more computing units that may implement various systems and methods discussed herein is provided. The computing system 1000 may be part of a controller, may be in operable communication with various implementations discussed herein, may run various operations related to the method or methods discussed herein, may be part of overall systems discussed herein. The system 1000 may be a part of a battery management system (BMS) if used in conjunction with a pack deployed in a vehicle, for example. The computing system 1000 may receive force measurement or compute force, or other sensor reading concerning the same, and control the various described motors or pumps to maintain pressure on the cell stacks through charge and discharge cycles. It will be appreciated that specific implementations of these devices may be of differing possible specific computing architectures ranging from a controller to more complicated systems, and may be a discrete system or part of a larger integrated system responsible for a range of tasks, such as a battery management system, not all of which are specifically discussed herein but will be understood by those of ordinary skill in the art. In such various possible implementations, more or fewer components discussed below may be included, interconnections and other changes made, as will be understood by those of ordinary skill in the art.

The computer system 1000 may be a computing system that is capable of executing a computer program product to execute a computer process. Data and program files may be input to the computer system 1000, which reads the files and executes the programs therein. Some of the elements of the computer system 1000 are shown in FIG. 10, including one or more hardware processors 1002, one or more data storage devices 1004, one or more memory devices 1006, and/or one or more ports 1008-1012. Additionally, other elements that will be recognized by those skilled in the art may be included in the computing system 1000 but are not explicitly depicted in FIG. 10 or discussed further herein. Various elements of the computer system 1000 may communicate with one another by way of one or more communication buses, point-to-point communication paths, or other communication means not explicitly depicted in FIG. 10. Similarly, in various implementations, various elements disclosed in the system may or not be included in any given implementation.

The processor 1002 may include, for example, a central processing unit (CPU), a microprocessor, a controller, a microcontroller, a digital signal processor (DSP), field programmable gate array (FPGA), application specific integrated circuit (ASIC), and/or combinations of the same, which may include one or more internal levels of cache. There may be one or more processors 1002, such that the processor 1002 comprises a single processing unit, or a plurality of processing units capable of executing different sets of instructions and/or performing operations in parallel with each other, commonly referred to as a parallel processing environment.

The presently described technology in various possible combinations and particularly related to the control method may be implemented, at least in part, in software stored on the data stored device(s) 1004, stored on the memory device(s) 1006, and/or communicated via one or more of the ports 1008-1012, thereby transforming the computer system 1000 in FIG. 10 to a special purpose machine for implementing the operations described herein.

The one or more data storage devices 1004 may include any non-volatile data storage device capable of storing data generated or employed within the computing system 1000, such as computer executable instructions for performing a computer process, which may include instructions of both application programs and an operating system (OS) that manages the various components of the computing system 1000. The data storage devices 1004 may include, without limitation, magnetic disk drives, optical disk drives, solid state drives (SSDs), flash drives, and the like. The data storage devices 1004 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1006 may include volatile memory (e.g., dynamic random-access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1004 and/or the memory devices 1006, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1000 includes one or more ports, such as an input/output (I/O) port 1008, a communication port 1010, and a sub-systems port 1012, for communicating with other computing, network, or vehicle devices. It will be appreciated that the ports 1008-1012 may be combined or separate and that more or fewer ports may be included in the computer system 1000. The I/O port 1008 may be connected to an I/O device, or other device, by which information is input to or output from the computing system 1000. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1000 via the I/O port 1008. In some examples, such inputs may be distinct from the various system and method discussed with regard to the preceding figures. Similarly, the output devices may convert electrical signals received from computing system 1000 via the I/O port 1008 into signals that may be sensed or used by the various methods and system discussed herein. The input device may be an alphanumeric input device, including alphanumeric and other keys for communicating information and/or command selections to the processor 1002 via the I/O port 1008.

The environment transducer devices convert one form of energy or signal into another for input into or output from the computing system 1000 via the I/O port 1008. For example, an electrical signal generated within the computing system 1000 may be converted to another type of signal, and/or vice-versa. In one implementation, the environment transducer may include various possible sensors that measure force, load, pressure or sense characteristics or aspects of an environment local to or remote from the computing device 1000, such as battery voltage, open circuit battery voltage, charge current, load current, and battery temperature.

In one implementation, a communication port 1010 may be connected to a network by way of which the computer system 1000 may receive network data useful in executing the methods and systems set out herein as well as transmitting information and network configuration changes determined thereby. For example, charging protocols may be updated, battery measurement or calculation data shared with external system, and the like. The communication port 1010 connects the computer system 1000 to one or more communication interface devices configured to transmit and/or receive information between the computing system 1000 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1010 to communicate with one or more other machines, either directly over a point-to-point communication path, over a wide area network (WAN) (e.g., the Internet), over a local area network (LAN), over a cellular (e.g., third generation (3G), fourth generation (4G), or fifth generation (5G)) network), or over another communication means.

The computer system 1000 may include a sub-systems port 1012 for communicating with one or more systems related to a device being charged according to the methods and system described herein to control an operation of the same and/or exchange information between the computer system 1000 and one or more sub-systems of the device. Examples of such sub-systems of a vehicle, include, without limitation, motor controllers and systems, battery management systems, and others.

The system set forth in FIG. 10 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Embodiments of the present disclosure include various operations, which also may be referred to as steps, which are described in this specification. The operations may be performed by hardware components or may be embodied in machine-executable instructions, which may be used to cause a general-purpose or special-purpose processor programmed with the instructions to perform the operations. Alternatively, the operations may be performed by a combination of hardware, software and/or firmware.

Although various representative embodiments of this invention have been described above with a certain degree of particularity, those skilled in the art could make numerous alterations to the disclosed embodiments without departing from the spirit or scope of the inventive subject matter set forth in the specification. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected to another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention.

Various modifications and additions can be made to the exemplary embodiments discussed without departing from the scope of the present invention. For example, while the embodiments, also referred to as implementations or examples, described above refer to particular features, the scope of this invention also includes embodiments having different combinations of features and embodiments that do not include all of the described features. Accordingly, the scope of the present invention is intended to embrace all such alternatives, modifications, and variations together and in various possible combinations of various different features of different embodiments combined to form yet additional alternative embodiments, with all equivalents thereof.

While specific embodiments are discussed, it should be understood that this is done for illustration purposes only. A person skilled in the relevant art will recognize that other components and configurations may be used without parting from the spirit and scope of the disclosure. Thus, the above description and drawings are illustrative and are not to be construed as limiting. Numerous specific details are described to provide a thorough understanding of the disclosure. However, in certain instances, well-known or conventional details are not described in order to avoid obscuring the description.

Reference to "one embodiment" or "an embodiment" means that a particular feature, structure, or characteristic described in connection with the embodiment is included in at least one embodiment of the disclosure. The appearances of the phrase "in one embodiment", or similarly "in one example" or "in one instance", in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the various embodiments for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Various features and advantages of the disclosure are set forth in the description above, and in part will be obvious from the description, or can be learned by practice of the herein disclosed principles. The features and advantages of the disclosure can be realized and obtained by means of the instruments and combinations particularly pointed out in the appended claims.

What is claimed:

1. A battery force management system comprising:

a first battery cell stack positioned between a first member and a second member, the first member movably mounted and arranged to apply a force on the first battery cell stack; and a drive unit operably coupled with the first member to move the first member to controllably apply the force, wherein the drive unit is operably coupled with the first member through a threaded drive rod operably coupled with a corresponding threaded portion of the first member to move the first member to controllably apply the force responsive to a determination of a pressure on the first cell stack.

2. The battery force management system of claim 1 wherein the determination of the pressure on the first battery cell stack is based on a change in size of the first battery cell stack during a charge or discharge of battery cells of the first battery cell stack.

3. The battery force management system of claim 1 wherein the drive unit is configured to rotate the first threaded drive rod to move the first member to controllably apply the force responsive to the determination of the pressure during the change in the first battery cell stack.

4. The battery force management system of claim 3 further comprising a second threaded drive rod operably coupled with the drive unit to rotate the second threaded drive rod, the second member movably mounted and arranged to cooperate with the first member to apply the force on the first battery cell stack, the first threaded drive rod and the second threaded drive rod each including a first threaded portion and a second threaded portion, the first threaded portion coupled with respective first threaded portion of the first member and the second threaded portion coupled with respective second threaded portions of the second member to move the first member and the second member inwardly toward each other or outwardly away from each other to controllably apply the force responsive to the determination of the pressure during the change in size of the cell stack.

5. The battery force management system of claim 3 wherein the drive unit comprises a planetary gear assembly with a planet gear operably coupled with the drive rod and a sun gear to drive the planet gear.

6. The battery force management system of claim 5 wherein the drive unit further comprises a motor supporting a worm gear to drive the sun gear.

7. The battery force management system of claim 3 wherein the drive unit comprises a belt and pulley system with a pulley coupled with the drive rod and a motor coupled with the pulley by way of a belt.

8. The battery force management system of claim 7 wherein the motor is coupled with the movable member.

9. The battery force management system of claim 1 wherein the first member is a first plate.

10. The battery force management system of claim 9 wherein the first plate is a first box end plate.

11. The battery force management system of claim 1 further comprising a second battery cell stack positioned between a third member and a fourth member, the third member movably mounted and arranged to apply a force on the second battery cell stack; and wherein the drive unit is positioned between the first battery cell stack and the second battery cell stack, the drive unit further operably coupled with the third member to move the third member to controllably apply the force on the second battery cell stack.

12. The battery force management system of claim 11 where the drive unit is a motor configured to turn a threaded axle that cooperates with a first threaded portion of the first member and a third threaded portion of the third member to move the first member toward the second member or away from the second member, and move the third member toward the fourth member or away from the fourth member to controllably apply the force on the first battery cell stack and the force on the second battery cell stack.

13. The battery force management system of claim 1 further comprising a load unit positioned to determine the pressure on the first battery cell stack.

14. The battery force management system of claim 1 wherein the first battery cell stack comprises solid-state pouch cells.

15. The battery force management system of claim 1 wherein the drive unit comprises a motor driving a threaded shaft operably coupled with a threaded aperture of the first member whereby rotation of the threaded shaft moves the first member to apply the force on the first battery cell stack.

16. The battery force management system of claim 1 wherein the drive unit comprises a piston rod and actuator, the piston rod coupled with the first member to move the first member to apply the force on the first battery cell stack.

17. The battery force management system of claim 16 further comprising a second battery cell stack positioned between a third member and a fourth member, the third member movably mounted and arranged to apply a force on the second battery cell stack; and wherein the actuator is coupled with the third member of the second battery cell stack, the actuation of the piston rod moving both the first member and the third member to control force on the first battery cell stack and force on the second battery cell stack.

18. A method of controlling battery cell stack pressure comprising:

accessing a value indicative of pressure on a plurality of battery cells; and responsive to the value indicative of pressure, controlling a drive unit to alter a position of at least one member operably engaging the plurality of battery cells, the altering of the position of the at least one member changing the pressure, wherein the drive unit is operably coupled with the first member through a threaded drive rod operably coupled with a corresponding threaded portion of the first member to alter the position of the first member.

19. The method of claim 18 wherein the plurality of battery cells comprises a plurality of solid-state pouch cells, each of the plurality of solid-state pouch cells changing volume in response to charge or discharge.

20. The method of claim 19 wherein the altering of the position of the at least one member operably engaging the plurality of solid-state pouch cells maintains a predetermined pressure on the plurality of solid-state pouch cells during the changing of the volume in response to charge or discharge.

21. The method of claim 19 wherein the at least one member is a plate in operably contact with at least one solid-state pouch cell of the plurality of battery cells, the altering of the position of the plate adjusting a force on the plurality of battery cells.

22. The method of claim 18 wherein the value indicative of pressure is a force measurement.

23. The method of claim 19 wherein the value indicative of pressure changes during charge and discharge of the solid-state pouch cells.

24. The method of claim 18 wherein accessing a value indicative of pressure is a sensor measurement indicative of force on the at least one member.

25. The method of claim 18 wherein the at least one member comprises a first plate and a second plate, the first plate and the second plate controllably movable relative to the plurality of battery cells, the plurality of battery cells positioned between the first plate and the second plate such as a relative movement of at least one of the first plate or the second plate adjusts force on the plurality of battery cells.

* * * * *